United States Patent
Merz et al.

(10) Patent No.: US 12,511,687 B2
(45) Date of Patent: *Dec. 30, 2025

(54) SYSTEMS AND METHODS FOR IDENTIFYING FULL ACCOUNT NUMBERS FROM PARTIAL ACCOUNT NUMBERS

(71) Applicant: MASTERCARD INTERNATIONAL INCORPORATED, Purchase, NY (US)

(72) Inventors: Christopher John Merz, Wildwood, MO (US); Joshua A. Allbright, Valley Park, MO (US); Melanie Gersten, Forest Hills, NY (US); Simon Hunt, Naples, FL (US); Felix Johannes Flory, Wildwood, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/623,893

(22) Filed: Apr. 1, 2024

(65) Prior Publication Data

US 2024/0242274 A1    Jul. 18, 2024

Related U.S. Application Data

(63) Continuation of application No. 17/138,437, filed on Dec. 30, 2020, now Pat. No. 11,948,189.

(51) Int. Cl.
  *G06Q 40/02*  (2023.01)
  *G06F 16/901*  (2019.01)
  *G06F 17/18*  (2006.01)

(52) U.S. Cl.
  CPC ......... *G06Q 40/02* (2013.01); *G06F 16/9017* (2019.01); *G06F 17/18* (2013.01)

(58) Field of Classification Search
  CPC ...................................................... G06Q 40/02
  See application file for complete search history.

(56) References Cited

U.S. PATENT DOCUMENTS 8,600,872 B1    12/2013  Yan
8,738,418 B2     5/2014  Winters
(Continued)

FOREIGN PATENT DOCUMENTS

KR    1020100001802 A    1/2010
KR    1020130101778 A    9/2013
WO       2020081043 A1    4/2020

OTHER PUBLICATIONS

PCT International Search Report and Written Opinion, Application No. PCT/US2021/055493, dated Feb. 15, 2022, 10 pps.

*Primary Examiner* — Edward Chang
(74) *Attorney, Agent, or Firm* — Armstrong Teasdale LLP

(57) ABSTRACT

A system for identifying complete account identifiers from partial account identifiers is provided. The system includes an account identification computing device including at least one processor and a memory device in communication with the at least one processor. The processor is configured to receive transaction data including unique merchant identifiers, build a merchant table using the transaction data, and receive a list including partial account identifiers. The processor is further configured to determine, for each unique merchant identifier, a number of candidate account identifiers and calculate at least one metric based on the number of candidate account identifiers. The processor is further configured to identify a source unique merchant identifier and match at least one candidate account identifier to a complete account identifier by matching one of the partial account identifiers to the at least one candidate account identifier.

20 Claims, 9 Drawing Sheets

(56) References Cited

U.S. PATENT DOCUMENTS

| | | |
|---|---|---|
| 9,159,084 B2 | 10/2015 | Magpayo et al. |
| 9,741,030 B2 * | 8/2017 | Tavares |
| 10,121,147 B2 * | 11/2018 | Greenspan ............. G06Q 20/12 |
| 10,154,082 B2 | 12/2018 | Banerjee et al. |
| 10,182,044 B1 | 1/2019 | Praus et al. |
| 2008/0283593 A1 | 11/2008 | He et al. |
| 2011/0307382 A1 | 12/2011 | Siegel et al. |
| 2016/0197907 A1 | 7/2016 | Bajenov et al. |
| 2018/0025354 A1 | 1/2018 | Groarke et al. |
| 2019/0188722 A1 | 6/2019 | Allbright et al. |

* cited by examiner

SYSTEMS AND METHODS FOR IDENTIFYING FULL ACCOUNT NUMBERS FROM PARTIAL ACCOUNT NUMBERS

CROSS REFERENCE TO RELATED APPLICATIONS

This application is a continuation of and claims priority to U.S. patent application Ser. No. 17/138,437 filed Dec. 30, 2020, the disclosure of which is hereby incorporated by reference in its entirety.

BACKGROUND

This disclosure relates generally to identifying account numbers and more particularly, to systems and methods for identifying account numbers based on known partial account numbers and transaction data.

Many merchants store payment card information, including payment card account numbers, for their returning customers, to process returns, and/or for purchase trend research. This payment card information may include other cardholder identifying information. In many cases, this information is stored for processing recurring transactions or to improve the speed of the checkout process for future online transactions. The stored payment card information allows a customer to avoid having to re-enter his or her payment card information every time the customer makes an online purchase from the merchant.

Primary account numbers (PANs) represent the number on a payment card for identifying the cardholder account and typically include, for example, a sequence of 16 digits. In many cases, these accounts are improperly exposed in public places (e.g., the Internet) or are detected and recovered by law enforcement efforts. However, oftentimes when these accounts are exposed, only a partial PAN (e.g., a PAN with one or more of the digits omitted) is available, rather than the complete PAN, encumbering the process of identifying accounts that have been improperly exposed. At least some existing systems are unable to ascertain exposed PANs when only corresponding partial PANs are available.

BRIEF DESCRIPTION

In one aspect, a system for identifying complete account identifiers from partial account identifiers is provided. The system includes an account identification computing device including at least one processor and a memory device in communication with the at least one processor. The at least one processor is configured to receive transaction data including a plurality of transactions, wherein each of the plurality of transactions includes a unique merchant identifier and an account identifier. The at least one processor is further configured to build a merchant table using the transaction data. The merchant table includes a plurality of merchant profiles, each of the merchant profiles including i) one of the unique merchant identifiers included in the plurality of transactions and ii) at least one account identifier associated with the unique merchant identifier. The at least one processor is further configured to receive a list including a plurality of partial account identifiers. The at least one processor is further configured to determine, for each unique merchant identifier in the merchant table, a number of candidate account identifiers, wherein the candidate account identifiers are account identifiers associated with the unique merchant identifier that are a potential match to a partial account identifier on the list. The at least one processor is further configured to calculate, for each unique merchant identifier in the merchant table, at least one metric based on the number of candidate account identifiers. The at least one processor is further configured to identify, from among the unique merchant identifiers in the merchant table, a source unique merchant identifier corresponding to a likely source of the plurality of partial account identifiers based on the at least one metric. The at least one processor is further configured to match at least one candidate account identifier to a complete account identifier by matching one of the plurality of partial account identifiers to the at least one candidate account identifier.

In another aspect, a computer-implemented method for identifying complete account identifiers from partial account identifiers is provided. The computer-implemented method is implemented using an account identification computing device in communication with a memory device. The computer-implemented method includes receiving, by the account identification computing device, transaction data including a plurality of transactions, wherein each of the plurality of transactions includes a unique merchant identifier and an account identifier. The computer-implemented method also includes building, by the account identification computing device, a merchant table using the transaction data. The merchant table includes merchant profiles, each of the merchant profiles including i) one of the unique merchant identifiers included in the plurality of transactions and ii) at least one account identifier associated with the unique merchant identifier. The computer-implemented method also includes receiving, by the account identification computing device, a list including a plurality of partial account identifiers. The computer-implemented method also includes determining, by the account identification computing device, for each unique merchant identifier in the merchant table, a number of candidate account identifiers, wherein the candidate account identifiers are account identifiers associated with the unique merchant identifier that are a potential match to a partial account identifier on the list. The computer-implemented method also includes calculating, by the account identification computing device, for each unique merchant identifier in the merchant table, at least one metric based on the number of candidate account identifiers. The computer implemented method also includes identifying, by the account identification computing device, from among the unique merchant identifiers in the merchant table, a source unique merchant identifier corresponding to a likely source of the plurality of partial account identifiers based on the at least one metric. The computer implemented method also includes matching, by the account identification computing device, at least one candidate account identifier that is a complete account identifier by matching one of the plurality of partial account identifier to the at least one candidate account identifier.

In yet another aspect, a non-transitory computer-readable storage media having computer-executable instructions embodied thereon is provided. When executed by an account identification computing device having at least one processor coupled to at least one memory device, the computer-executable instructions cause the processor to receive transaction data including a plurality of transactions, wherein each of the plurality of transactions includes a unique merchant identifier and an account identifier. The computer-executable instructions further cause the processor to build a merchant table using the transaction data. The merchant table including a plurality of merchant profiles, each of the merchant profiles including i) one of the unique merchant identifiers included in the plurality of transactions and ii) at least one account identifier associated with the unique merchant identifier. The computer-executable instructions further cause the processor to receive a list including a plurality of partial account identifiers. The computer-executable instructions further cause the processor to determine, for each unique merchant identifier in the merchant table, a number of candidate account identifiers, wherein the candidate account identifiers are account identifiers associated with the unique merchant identifier that are a potential match to a partial account identifier on the list. The computer-executable instructions further cause the processor to calculate, for each unique merchant identifier in the merchant table, at least one metric based on the number of candidate account identifiers. The computer-executable instructions further cause the processor to identify, from among the unique merchant identifiers in the merchant table, a source unique merchant identifier corresponding to a likely source of the plurality of partial account identifiers based on the at least one metric. The computer-executable instructions further cause the processor to match at least one candidate account identifier to a complete account identifier by matching one of the plurality of partial account identifier to the at least one candidate account identifier.

DETAILED DESCRIPTION

Figure 1:
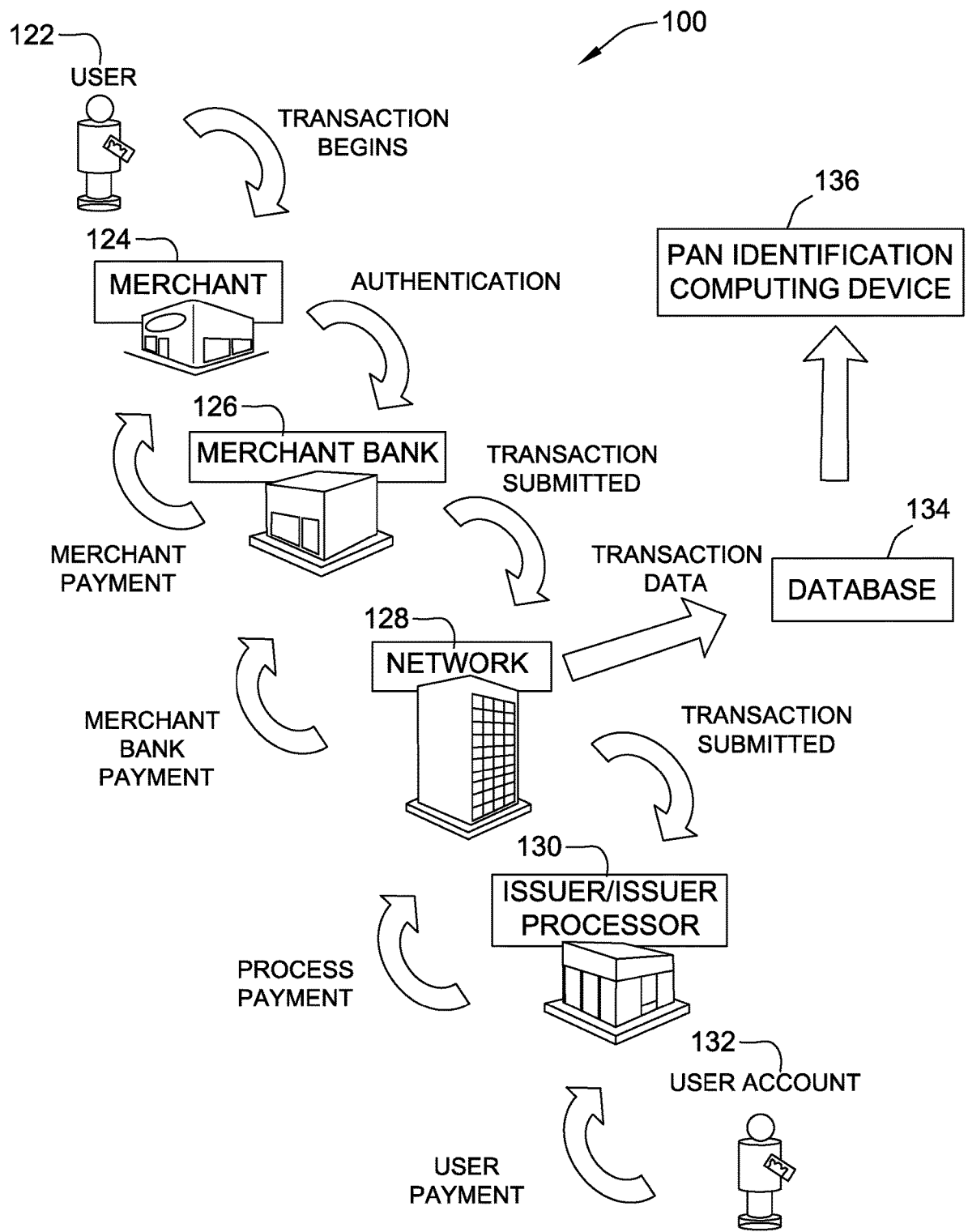
FIG. 1 is a schematic diagram illustrating an example multi-party payment processing system for enabling payment-by-card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods utilizing a primary account number (PAN) identification system for identifying complete account identifiers (e.g., PANs) from partial PANs (e.g., PANs with one or more digits omitted) known to be exposed. The PAN identification system described herein includes at least one PAN identification computing device that identifies PANs associated with exposed partial PANs. The PAN identification computing device may be in communication with at least one merchant computing device (e.g., a point-of-sale (POS) terminal), a payment processor, and at least one third party provider of partial PANs that are deemed to be exposed. The third party providers may include law enforcement agencies, financial institutions, or any other institutions that provide exposed partial PANs.

The PAN identification computing device includes a processor in communication with a memory. The PAN identification computing device is further in communication with at least one database for storing information, such as transaction data. The transaction data may include one or more payment transactions initiated by a user using a payment device (e.g., a payment card, digital wallet, mobile payment, etc.) associated with a particular transaction processing network. The transaction data may include, among other data points, data associated with the user and the merchant involved in the payment transaction. For example, for a given payment transaction, transaction data may include one or more of: a user account identifier (e.g., a PAN), user biometric data, a unique merchant identifier, a merchant computing device identifier, a transaction amount, a time and date of the transaction (e.g., a timestamp), data descriptive of the purchase, a location of the transaction, and/or other data associated with the payment transaction. In the example embodiment, as some of the information stored in the database may include personally identifiable information (PII), any stored PII is encrypted to prevent unauthorized access to the PII. Moreover, in any embodiments in which PII may be collected, the user from which the PII may be collected is provided an opportunity to agree to or deny collection of such data.

In some embodiments, the PAN identification computing device is configured to build a merchant table that includes a plurality of merchant profiles. The merchant profiles may include, for example i) a unique merchant identifier, ii) data corresponding to transactions associated with the unique merchant identifier such as transaction times (e.g., time stamps) and PANs associated with the transaction and iii) other merchant data such as a merchant name identifier. For example, the PAN identification computing device may receive transaction data including a PAN and a unique merchant identifier corresponding to a merchant (e.g., grocery store A), where the PAN was used at the merchant. The PAN identification computing device is further configured add each unique merchant identifier to the merchant table along with any PANs associated with each unique merchant identifier (e.g., PANs used at the corresponding merchant).

The PAN identification computing device is also configured to receive partial PANS (e.g., a list of partial PANs) deemed to be exposed from one or more third parties. Each partial PAN in the partial PAN list may include associated metadata (e.g., an expiration date of the account corresponding to the partial pan, a date added to the list, a channel, or other metadata).

The PAN identification computing device is also configured to determine, for each unique merchant identifier in the merchant table, a number of candidate PANs (e.g., PANs that potentially correspond to a partial PAN in the list). The PAN identification computing device is may compare PANs in the merchant table to the partial PANs in the partial PAN list. If the PANs in the merchant table are potential matches to partial PANs in the partial PAN list (e.g., the known digits of a partial PAN match corresponding digits of a complete PAN), the PAN identification computing device retrieves, from the merchant table, the unique merchant identifiers associated with the PANs that potentially match the partial PANs in the partial PAN list. The PAN identification computing device may then count the number PANs that are potential matches to partial PANs in the list for each of the retrieved unique merchant identifiers to determine the number of candidate PANs.

The PAN identification computing device is further configured to calculate one or more metrics to identify one or more merchants most likely to be a common source of partial PANs in the partial PAN list. While a given partial PAN in the partial PAN list may potentially match thousands or millions of complete PANs (e.g., candidate PANs), it is possible to match the partial PAN to its corresponding complete PAN when considering only candidate PANs that were used at a merchant corresponding to the source as potential matches. Thus, selecting a merchant that is likely the source of the partial PANS enables the PAN identification computing device to identify the candidate PANs that correspond to the partial PANs in the list.

In some embodiments, the PAN identification computing device aggregates multiple unique merchant identifiers (e.g., unique merchant identifiers associated with different locations of a same merchant company) into a cleansed merchant name. The PAN identification computing device may retrieve metrics across cleansed merchant names alternatively or in addition to retrieving metrics across unique merchant identifiers. The PAN identification computing device may aggregate unique merchant identifiers by parsing the merchant table and performing a look up for unique merchant identifiers with the same merchant name. For example, assume franchise restaurant C has multiple locations, and each location has its own unique merchant identifier. The PAN identification computing device parses the merchant table and performs a lookup for restaurant C. Once the PAN identification computing device has found each unique merchant identifier associated with a location of restaurant C in the merchant table, the PAN identification computing device retrieves all the unique merchant identifiers associated with a location of restaurant C, consolidates them, and lists them in a single file list (e.g., string) in association with a cleansed merchant name. Thus, all the transactions of the different locations of restaurant C have a common cleansed merchant name that can be used by the PAN identification computing device to determine a likelihood that restaurant C is the source of the partial PANs in the partial PAN list.

In certain embodiments, the metric may be, for example, a percentage of PANs used at the merchant that potentially match partial PANs in the partial PAN list (e.g., candidate PANs). The PAN identification computing device computes the percentage metric by dividing the determined number of candidate PANs used at the merchant by a total number of PANs used at the merchant.

The percentage metric enables the PAN identification computing device to identify merchants that are most likely to be a common source of partial PANs in the partial PAN list. For example, if the percentage of PANs associated with a merchant that are candidate PANs is one hundred percent or a number relatively close to one hundred percent, the PAN identification computing device may identify the merchant as a source of partial PANs in the list. In some embodiments, PAN identification computing device computes the percentage metric for each unique merchant identifier and identifies which unique merchant identifier most likely corresponds to the source of the partial PANs. In some other embodiments, the PAN identification computing device is configured to compute the percentage metric for each cleansed merchant name in order to identify a merchant (e.g., a merchant having multiple locations) that is most likely a source. Once the PAN identification computing device identifies the merchant by the cleansed merchant name, the PAN identification computing device may compute the percentage metric for each unique merchant identifier (e.g., of each individual location of the merchant) for the identified cleansed merchant name in order to identify a particular location of the merchant that is most likely a source of the partial PANs.

In some embodiments, the metric is a partial chi-square test of the unique merchant identifiers and/or cleansed merchant names. The partial chi-square test is used to determine whether there is a difference between i) the expected number of candidate PANs for a particular unique merchant identifier and/or cleansed merchant name and ii) the actual number of candidate PANs. Because a higher than expected number candidate PANs used at a particular merchant indicates a greater likelihood that the particular merchant is the source of the partial PANs in the partial PAN list, the partial chi-square test enables the PAN identification computing device to rank unique merchant identifiers and/or cleansed merchant names based on a partial chi-square corresponding to the likelihood that the particular unique merchant identifier or cleansed merchant name is a source of the partial PANs in the list.

For example, the PAN identification computing device may receive 500,000 partial PANs and generate a partial PAN list including the received partial PANs. The PAN identification computing device then compares the partial PANs in the partial PAN list to PANs in the merchant table to find candidate PANs, and retrieves merchant information (e.g., a unique merchant identifier) corresponding to the candidate PANs. In this example, one of the merchants is a gas station. The PAN identification computing device determines that there are 40,000 different PANs used at the gas station during the year. The PAN identification computing device further determines that there are 500,000 partial PANs in the partial PAN list. The PAN identification computing device further determines that 20,000 of the PANs used at the gas station are candidate PANs. The PAN identification computing device further determines the total number of PANs received for all merchants during the year is 400 million. The PAN identification computing device computes the partial chi-square test as follows:

$$\frac{\text{Total \# of } PANs \text{ for Merchant} \times \text{Total \# of partial } PANs \text{ in partial } PAN \text{ list}}{\text{Total Number of } Pans \text{ Recieved For All Merchants During The Year}} = X$$

$$\frac{(\text{Candidate } PANs \text{ for Merchant} \times X)^2}{X} = \text{Partial Chi-Square}$$

In this example the PAN identification computing device computes the following:

$$\frac{40{,}000 \times 500{,}000}{400{,}000{,}000} = 50$$

$$\frac{(20{,}0000 \times 50)^2}{50} = 7{,}960{,}050$$

A partial chi-square that is larger corresponds to a greater than expected number of candidate PANs used at the particular merchant and thus a greater likelihood that the particular merchant is the source of the partial PANs in the list. In the example embodiment, the PAN identification computing device computes a partial chi-square for each merchant and compares the partial chi-square of the merchants to determine which merchants are more likely sources of the partial PANs. The PAN identification computing device may rank the merchants by partial chi-square and select, for example, a merchant with the highest partial chi-square. For example, assuming that a partial chi-square of 7,960,050 is greater than that of the other merchants analyzed, the PAN identification computing device may identify the gas station as a merchant that is a likely source of the partial PANs.

In certain embodiments, the metric includes a z-score (i.e., a signed fractional number of standard deviations above a mean value) for each merchant. The z-score for each merchant is calculated by computing a percentage of PANs associated with transactions at the merchant that are candidate PANs, finding a mean percentage and standard deviation across all the merchants, and for each merchant, computing the number of standard deviations that the percentage for that merchant is above the mean across all the merchants. For example, in the example above, 20,000 out of the 40,000 different PANs used at the gas station correspond to candidate PANs, so the percentage for the gas station would be 50%. In this example, the PAN identification computing device determines the mean percentage across all the merchants is 1%, and the standard deviation is 0.5%. The PAN identification computing device computes the z-score as follows:

$$\frac{\text{Percentage for Merchant} - \text{Mean percentage}}{\text{Standard deviation}} = z\text{-score}$$

In this example the PAN identification computing device computes the following:

$$\frac{50\% - 1\%}{0.5\%} = 98$$

A z-score that is larger corresponds to a greater than expected number of PANs that are potential matches of partial PANs in the partial PAN list used at the particular merchant and thus a greater likelihood that the particular merchant is the source of the partial PANs. In some embodiments, the PAN identification computing device compares the z-scores of merchants to determine which merchants are more likely sources of the partial PANs in the list. The PAN identification computing device may rank the merchants analyzed by z-score and select a merchant with the highest z-score. In this example, the z-score is 98, meaning that the percentage of percentage of partial PANs associated with transactions at the gas station that are in the received partial PAN list is 98 standard deviations above what would be expected (i.e., the mean value). Thus, the PAN identification computing device may identify the gas station as a likely source of the partial PANs. In other embodiments, the PAN identification computing device uses a different method to rank merchants against each other (e.g., partial chi-square, as described above), and uses the z-score as a filtering threshold (e.g., merchants with a z-score under a certain threshold value are never selected).

The PAN identification computing device is further configured to identify candidate PANs that correspond to a complete PAN by matching the candidate PANs used at the identified source to partial PANs in the list. Only considering PANs associated with the selected merchant enables the PAN identification computing device to efficiently identify at-risk PANs. In some cases, each partial PAN may be matched to a PAN unambiguously (e.g., each partial PAN has only one complete PAN used at the selected merchant with which it may match). In cases where each partial PAN cannot be unambiguously matched to a PAN (e.g., when the partial PAN has known digits that correspond to more than one complete PAN), the PAN identification computing device may disambiguate the matches, for example, by using additional data, such as metadata included with the partial PAN in the list (e.g., by matching a PAN to a partial PAN having the same expiration date).

The technical problems addressed by the disclosure include at least one of: (i) inability to identify exposed primary account numbers (PANs) when only corresponding partial PANs (e.g., PANs with one or more omitted digits) are known; (ii) difficulty in identifying PANs before misuse occurs; and (iii) difficulty in identifying a common point of purchase of the partial PANs.

The technical effects achieved by the systems and methods described herein include at least one of: (i) receiving transaction data including a plurality of transactions, wherein each of the plurality of transactions includes a unique merchant identifier and an account identifier; (ii) building a merchant table using the transaction data, the merchant table including a plurality of merchant profiles, each of the merchant profiles including one of the unique merchant identifiers included in the plurality of transactions and at least one account identifier associated with the unique merchant identifier; (iii) receiving a list including a plurality of partial account identifiers; (iv) determining, for each unique merchant identifier in the merchant table, a number of candidate account identifiers, wherein the candidate account identifiers are account identifiers associated with the unique merchant identifier that are a potential match to a partial account identifier on the list; (v) calculating, for each unique merchant identifier in the merchant table, at least one metric based on the number of candidate account identifiers; (vi) identifying, from among the unique merchant identifiers in the merchant table, a source unique merchant identifier corresponding to a likely source of the plurality of partial account identifiers based on the at least one metric; and (vii) matching at least one candidate account identifier to a complete account identifier by matching one of the plurality of partial account identifiers to the at least one candidate account identifier.

The resulting technical benefits achieved by the systems and methods of the disclosure include at least one of: (i) identifying full primary account numbers (PANs) that may have been exposed from corresponding partial PANs; (ii) identifying PANs that may have been exposed before the PANs are misused; (iii) identifying merchants that are the most likely source of exposed partial PANs and are thus likely the site of a data incident.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party payment processing system 120 for enabling payment-by-card transactions. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, New York).

As described with respect to payment processing system 120, a financial institution called the "issuer" issues a transaction card or electronic payments account identifier, such as a credit card or debit card, to a consumer, cardholder, or user 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." The transaction card and associated account have an identifier called a primary account number (PAN) that appears on the transaction card. User 122 may tender payment for a purchase using a transaction card either by physically presenting the card or by providing the PAN and accompanying information (e.g., an expiration date of the transaction card or a security code associated with the transaction card). When user 122 tenders payment for a purchase with the transaction card, merchant 124 requests authorization from a merchant bank 126 for the amount of the purchase. The request may be performed over the telephone, but is usually performed through the use of a point-of-sale (POS) terminal, which reads user's 122 account information (e.g., the PAN) from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the POS terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether user's account 132 associated with user 122 is in good standing and whether the purchase is covered by user's account 132 available credit line. Based on these determinations, the request for authorization will be declined or accepted. If the request is accepted, an authorization code is issued to merchant 124.

When a request for authorization is accepted, the available credit line of user's account 132 is decreased. Normally, a charge for a payment card transaction is not posted immediately to user's account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If user 122 cancels a transaction before it is captured, a "void" is generated. If user 122 returns goods after the transaction has been captured, a "credit" is generated. Interchange network 128 and/or issuer bank 130 stores the transaction data, such as a category of merchant, a unique merchant identifier, a location where the transaction was completed, amount of purchase, a date and time of the transaction (e.g., a time stamp), and an account identifier (e.g., a PAN) in a database 134. A PAN identification computing device 136 may access transaction data stored in database 134, enabling PAN identification computing device 136 to, for example, build a merchant table using unique merchant identifiers, time stamps, and PANs.

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, user's account 132 is decreased. Normally, a charge is posted immediately to user's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and merchant's 124 account related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, user 122 registers one or more payment cards with a digital wallet. Having done this, user 122 can interact with a participating online merchant 124. At the check-out stage, online merchant 124 displays a button on the merchant website which user 122 can click on in order to make a payment using the user's 122 digital wallet. Online merchant 124 then redirects user 122 to a "switch" operated by interchange network 128. Using a cookie located on the user's computer, the "switch" is able to determine which wallet-hosting server hosts a wallet associated with user 122. The switch then establishes a connection between the user's computer and the appropriate wallet-hosting system, which presents user 122 with a sign-in page (e.g., as a pop-up window), where there is an authentication process (e.g., entry of a pre-agreed password). This log-in process may use the same login credentials (e.g., password) which user 122 also uses to obtain access to other online banking activities.

The wallet-hosting system then securely transfers user's 122 payment information to the online merchant's domain. The merchant's domain submits user's 122 payment information to merchant bank 126 for a separate authorization process in which the acquiring domain communicates with the issuer bank 130 to ask the bank to authorize the transaction. Thus, user 122 is not required to enter their card details (except at the stage of initially registering with the wallet-hosting system), and the online transaction process is streamlined with only a single redirection, and consistent branding for the entire payment process, irrespective of the online merchant 124.

In some embodiments, a unique identifier is provided to user 122. The unique identifier is different from the PAN associated with user's account 132. In these embodiments, interchange network 128 stores the unique identifier in database 220 along with user's account 132. When interchange network 128 receives the unique identifier, interchange network 128 determines the associated user's account 132 and uses that information in processing the payment transaction.

Figure 2:
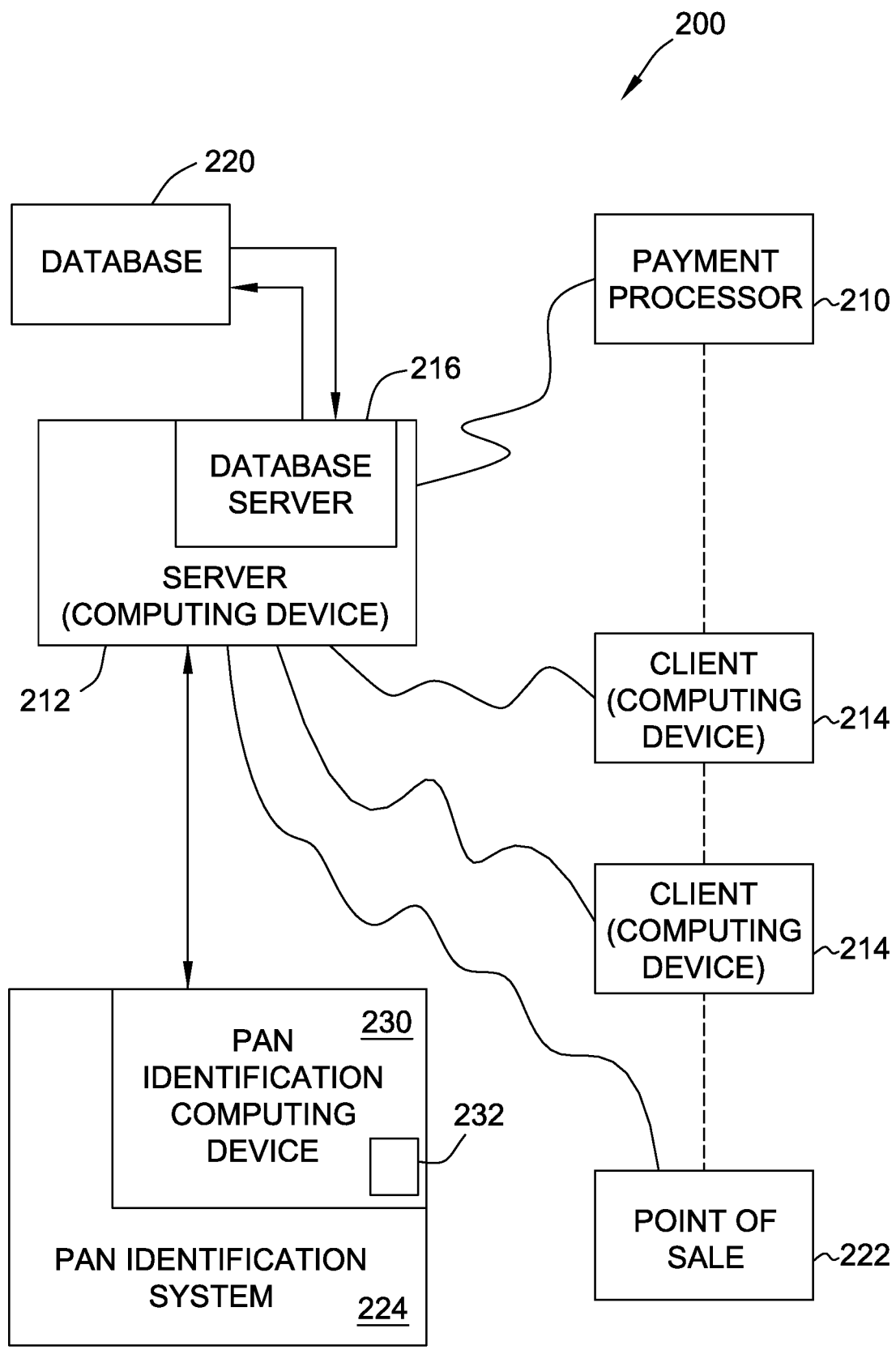
FIG. 2 is a simplified block diagram of an example system used for identifying primary account numbers (PANs) from partial PANs in accordance with an example embodiment of the present disclosure.

FIG. 2 is a simplified block diagram of an example system 200 used for identifying full PANs from partial PANs in accordance with one example embodiment of the present disclosure. System 200 may be implemented in the performance of payment-by-card transactions received as part of processing user transactions. In an example embodiment, system 200 is a payment processing system that includes a PAN identification system 224 configured to identify PANs that have been exposed using transaction data and information received from third parties.

In the example embodiment, system 200 includes a server system 212 and client computing devices 214 (also referred to as client systems 214). In some embodiments, client systems 214 include computers configured to implement a web browser or a software application, which enables client systems 214 to access server system 212 using the Internet. Client systems 214 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 214 include any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, client systems 214 may be computing devices associated with one of user 122, merchant 124, merchant bank 126, and/or issuer bank 130, as illustrated in FIG. 1. Client system 214 may also be associated with third parties (not shown), such as a third party capable of providing exposed partial PANs.

In one embodiment, server system 212 includes a database server 216 that is communicatively coupled to a database 220 for storing data. In an exemplary embodiment, database 220 stores transaction information from a plurality of users and paths based on the individual transactions. According to the exemplary embodiment, database 220 is disposed remotely from server system 212. In other embodiments, database 220 is decentralized, or may be a portion of server system 212. In the exemplary embodiment, a user (not shown) is able to access database 220 through client systems 214 by logging onto server system 212. In the example embodiment, server system 212 may be associated with payment processor 210.

System 200 further includes one or more point-of-sale (POS) systems 222 that are communicatively coupled with the server system 212. POS systems 222 may be, for example, merchants 124, and are communicatively coupled with server system 212 through payment processing system 120. POS systems 222 may include, without limitation, machines that accept card swipes, online payment portals, digital wallet payments, or stored payment card numbers for recurring transactions.

In the example embodiment, server system 212 is associated with a financial transaction interchange network, such as interchange network 128 shown in FIG. 1, and is also referred to as an interchange computer system. In some embodiments, server system 212 is used for processing transaction data and analyzing for fraudulent transactions. In one embodiment, at least one of client systems 214 includes a computer system associated with an issuer of a transaction payment card. Accordingly, server system 212 and client systems 214 may be utilized to process transaction data relating to purchases user 122 makes utilizing a transaction card processed by interchange network 128 and issued by the associated issuer bank 130. In the exemplary embodiment, at least one client system 214 may be associated with user 122 seeking to register, access information, or process a transaction with at least one of interchange network 128, issuer bank 130, or merchant 124. In addition, client systems 214 or POS systems 222 may include individual point-of-sale (POS) terminals (not shown) associated with merchant 124 and used for processing payment transactions. In an alternative embodiment, at least one client system 214 is utilized for investigating potential anomalies. Transaction data may be generated with respect to each purchase user 122 makes using the transaction card and may include, for example, a unique merchant identifier, a time stamp, and an account identifier (e.g., a PAN). Such transaction data may be stored in database 220 (which may be similar to database 134 shown in FIG. 1) and accessed by PAN identification computing device 230 (which may be similar to PAN identification computing device 136 shown in FIG. 1) through server system 212.

In the example embodiment, PAN identification system 224 is communicatively coupled with server system 212. PAN identification system 224 can access server system 212 to store and access data and to communicate with the client systems 214 through server system 212. In some embodiments, PAN identification system 224 may be associated with or part of payment processor 210, or in communication with payment processing system 120, shown in FIG. 1. In other embodiments, PAN identification system 224 is associated with the third parties and is in electronic communication with the payment processing system 120. In some embodiments, PAN identification system 224 may be associated with, or be part of merchant bank 126, interchange network 128, and issuer bank 130.

In the example embodiment, PAN identification system 224 includes at least one PAN identification computing device 230 that is communicatively coupled (e.g., either directly or indirectly to database 220. PAN identification computing device 230 may receive transaction data from database 220. The transaction data may include one or more payment transactions initiated by a user (e.g., user 122 shown in FIG. 1) using a payment device (e.g., a payment card, digital wallet, mobile payment, etc.) associated with a particular transaction processing network (e.g., multi-party payment processing system 120 shown in FIG. 1). The transaction data may include, among other data points, data associated with the user and the merchant involved in the payment transaction. For example, for a given payment transaction, transaction data may include one or more of: a user account identifier (e.g., a PAN), user biometric data, a unique merchant identifier, a merchant computing device identifier, a transaction amount, a time and date of the transaction (e.g., a timestamp), data descriptive of the purchase, a location of the transaction, and/or other data associated with the payment transaction.

In the example embodiments, the PAN identification computing device is configured to build a merchant table 232 that includes a plurality of merchant profiles. The merchant profiles may include, for example i) a unique merchant identifier, ii) data corresponding to transactions associated with the unique merchant identifier such as transaction times (e.g., time stamps) and PANs associated with the transaction and iii) other merchant data such as a merchant name identifier. PAN identification computing device 230 may add each unique merchant identifier to the merchant table along with any PANs associated with each unique merchant identifier (e.g., PANs used at the corresponding merchant).

In the example embodiment, PAN identification computing device 230 is communicatively coupled (e.g., either directly or indirectly) to the third parties and configured to receive a list of partial PANs deemed to be exposed from the third parties. Each partial PAN in the partial PAN list may include associated metadata (e.g., an expiration date of the account corresponding to the partial pan, a date added to the list, a channel, or other metadata).

In the example embodiment, PAN identification computing device 230 may also determine, for each unique merchant identifier in merchant table 232, a number of candidate PANs (e.g., PANs that potentially correspond to a partial PAN in the list). PAN identification computing device 230 may compare PANs in merchant table 232 to the partial PANs in the list. If the PANs in the merchant table are potential matches to partial PANs in the list (e.g., the known digits of a partial PAN match corresponding digits of a complete PAN), PAN identification computing device 230 retrieves, from merchant table 232, the unique merchant identifiers associated with the PANs that potentially match the partial PANs in the list. PAN identification computing device 230 may then count the number PANs that are potential matches to partial PANs in the list for each of the retrieved unique merchant identifiers to determine the number of candidate PANs.

In the example embodiment, PAN identification computing device 230 may calculate one or more metrics to identify one or more merchants most likely to be a common source of partial PANs in the partial PAN list. While a given partial PAN in the partial PAN list may potentially match thousands or millions of complete PANs (e.g., candidate PANs), it is possible to match the partial PAN to its corresponding complete PAN when considering only candidate PANs that were used at a merchant corresponding to the source as potential matches. Thus, selecting a merchant that is likely the source of the partial PANS enables PAN identification computing device 230 to identify the candidate PANs that correspond to the partial PANs in the list.

In some embodiments, the metric is a partial chi-square test of the unique merchant identifiers and/or cleansed merchant names. The partial chi-square test is used to determine whether there is a difference between i) the expected number of candidate PANs for a particular unique merchant identifier and/or cleansed merchant name and ii) the actual number of candidate PANs. Because a higher than expected number candidate PANs used at a particular merchant indicates a greater likelihood that the particular merchant is the source of the partial PANs in the partial PAN list, the partial chi-square test enables PAN identification computing device 230 to rank unique merchant identifiers and/or cleansed merchant names based on a partial chi-square corresponding to the likelihood that the particular unique merchant identifier or cleansed merchant name is a source of the partial PANs in the list.

For example, PAN identification computing device 230 may receive 500,000 partial PANs and generate a partial PAN list including the received partial PANs. PAN identification computing device 230 may then compare the partial PANs in the partial PAN list to PANs in the merchant table to find candidate PANs, and retrieve merchant information (e.g., a unique merchant identifier) corresponding to the candidate PANs. In this example, one of the merchants is a gas station. PAN identification computing device 230 determines that there are 40,000 different PANs used at the gas station during the year. PAN identification computing device 230 may further determine that there are 500,000 partial PANs in the partial PAN list. PAN identification computing device 230 may further determine that 20,000 of the PANs used at the gas station are candidate PANs. PAN identification computing device 230 may further determine the total number of PANs received for all merchants during the year is 400 million. PAN identification computing device 230 may compute the partial chi-square test as follows:

$$\frac{\text{Total \# of } PANs \text{ for Merchant} \times \text{Total \# of partial } PANs \text{ in partial } PAN \text{ list}}{\text{Total Number of } Pans \text{ Recieved For All Merchants During The Year}} = X$$

$$\frac{(\text{Candidate } PANs \text{ for Merchant} \times X)^2}{X} = \text{Partial Chi-Square}$$

In this example PAN identification computing device 230 computes the following:

$$\frac{40{,}000 \times 500{,}000}{400{,}000{,}000} = 50$$

$$\frac{(20{,}0000 \times 50)^2}{50} = 7{,}960{,}050$$

A partial chi-square that is larger corresponds to a greater than expected number of candidate PANs used at the particular merchant and thus a greater likelihood that the particular merchant is the source of the partial PANs in the list. In the example embodiment, PAN identification computing device 230 computes a partial chi-square for each merchant and compares the partial chi-square of the merchants to determine which merchants are more likely sources of the partial PANs. PAN identification computing device 230 may rank the merchants by partial chi-square and select, for example, a merchant with the highest partial chi-square. For example, assuming that a partial chi-square of 7,960,050 is greater than that of the other merchants analyzed, PAN identification computing device 230 may identify the gas station as a merchant that is a likely source of the partial PANs.

In certain embodiments, the metric includes a z-score (i.e., a signed fractional number of standard deviations above a mean value) for each merchant. The z-score for each merchant is calculated by computing a percentage of PANs associated with transactions at the merchant that are candidate PANs, finding a mean percentage and standard deviation across all the merchants, and for each merchant, computing the number of standard deviations that the percentage for that merchant is above the mean across all the merchants. For example, in the example above, 20,000 out of the 40,000 different PANs used at the gas station correspond to candidate PANs, so the percentage for the gas station would be 50%. In this example, PAN identification computing device 230 may determine the mean percentage across all the merchants is 1%, and the standard deviation is 0.5%. PAN identification computing device 230 may compute the z-score as follows:

$$\frac{\text{Percentage for Merchant} - \text{Mean percentage}}{\text{Standard deviation}} = z\text{-score}$$

In this example the PAN identification computing device computes the following:

$$\frac{50\% - 1\%}{0.5\%} = 98$$

A z-score that is larger corresponds to a greater than expected number of PANs that are potential matches of partial PANs in the partial PAN list used at the particular merchant and thus a greater likelihood that the particular merchant is the source of the partial PANs. In some embodiments, PAN identification computing device 230 compares the z-scores of merchants to determine which merchants are more likely sources of the partial PANs in the list. PAN identification computing device 230 may rank the merchants analyzed by z-score and select a merchant with the highest z-score. In this example, the z-score is 98, meaning that the percentage of percentage of partial PANs associated with transactions at the gas station that are in the received partial PAN list is 98 standard deviations above what would be expected (i.e., the mean value). Thus, PAN identification computing device 230 may identify the gas station as a likely source of the partial PANs. In other embodiments, PAN identification computing device 230 uses a different method to rank merchants against each other (e.g., partial chi-square, as described above), and uses the z-score as a filtering threshold (e.g., merchants with a z-score under a certain threshold value are never selected).

In the example embodiment, PAN identification computing device 230 may identify candidate PANs that correspond to a complete PAN by matching the candidate PANs used at the identified source to partial PANs in the list. In some cases, each partial PAN may be matched to a PAN unambiguously (e.g., each partial PAN has only one complete PAN used at the selected merchant with which it may match). In cases where each partial PAN cannot be unambiguously matched to a PAN (e.g., when the partial PAN has known digits that correspond to more than one complete PAN), PAN identification computing device 230 may disambiguate the matches, for example, by using additional data, such as metadata included with the partial PAN in the list (e.g., by matching a PAN to a partial PAN having the same expiration date).

Figure 3:
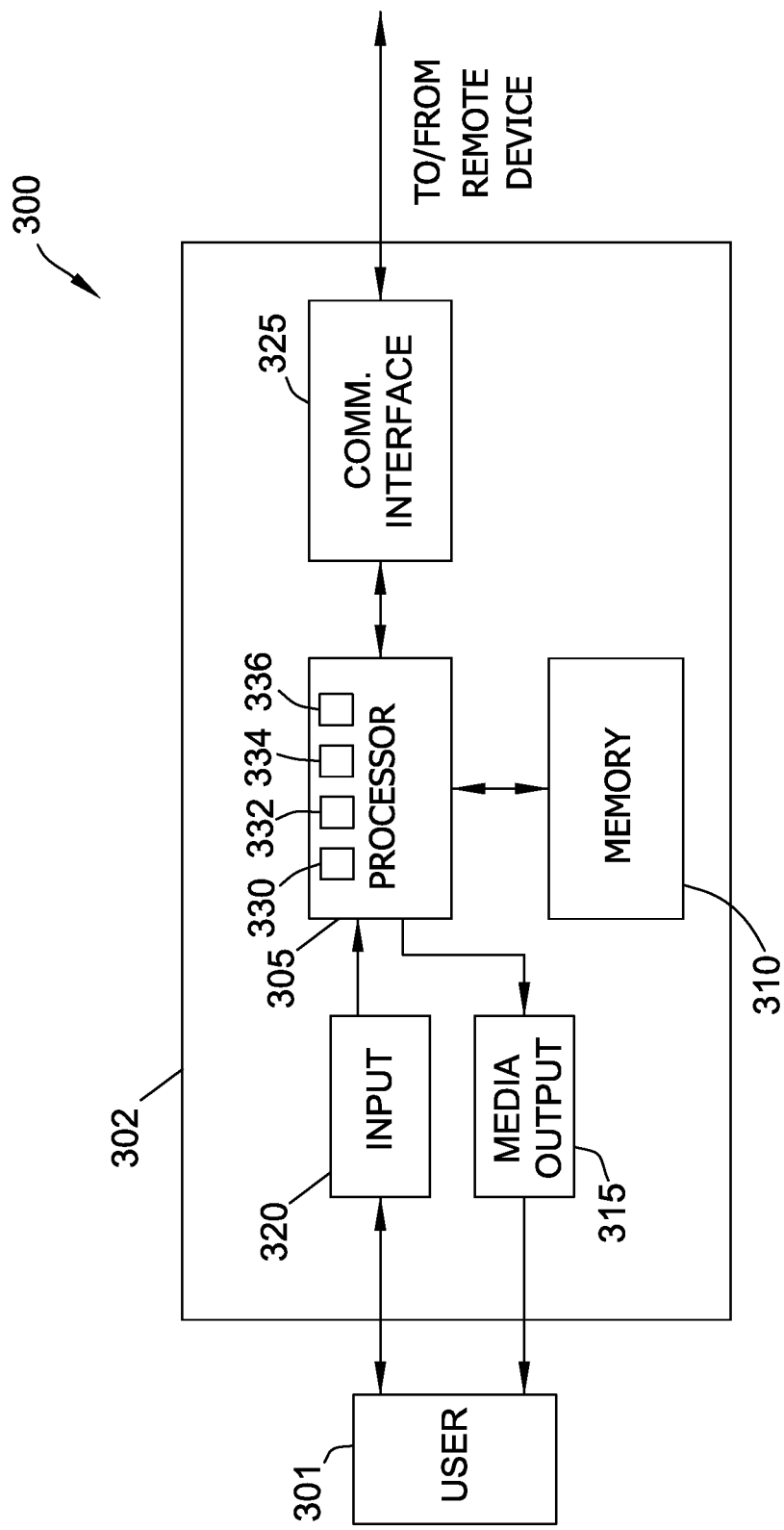
FIG. 3 illustrates an example configuration of a PAN identification system shown in FIG. 2, in accordance with an embodiment of the present disclosure.

FIG. 3 illustrates an example configuration of a PAN identification system 300 in accordance with one embodiment of the present disclosure. In some embodiments, PAN identification system 300 is similar to PAN identification system 224 (shown in FIG. 2). In the example embodiment, PAN identification system 300 includes at least one PAN identification computing device 302, operated by a user 301. In some embodiments, PAN identification computing device 302 is similar to PAN identification computing device 230 (shown in FIG. 2). PAN identification computing device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions and/or transaction data to be stored and retrieved. Memory area 310 may further include one or more computer readable media.

In the example embodiment, PAN identification computing device 302 further includes at least one media output component 315 for presenting information to user 301. Media output component 315 may, for example, be any component capable of converting and conveying electronic information to user 301. For example, media output component 315 may be a display component configured to display component lifecycle data in the form of reports, dashboards, communications, and the like In some embodiments, media output component 315 includes an output adapter (not shown), such as a video adapter and/or an audio adapter, which is operatively coupled to processor 305 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or a client application, to user 301. The graphical user interface may include, for example, an online store interface for viewing and/or purchasing items, and/or a wallet application for managing payment information. In some embodiments, PAN identification computing device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, an iris reader/scanner, a retina reader/scanner, a profile scanner, or the like. A single component such as a touch screen may function as both an output device of media output component 315 and input device 320. PAN identification computing device 302 may also include a communication interface 325, which is communicatively connectable to a remote device such as server system 212 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 212. A client application allows user 301 to interact with a server application from server system 212. For example, instructions may be stored by a cloud service, and the output of the execution of the instructions sent to the media output component 315.

Figure 5A:
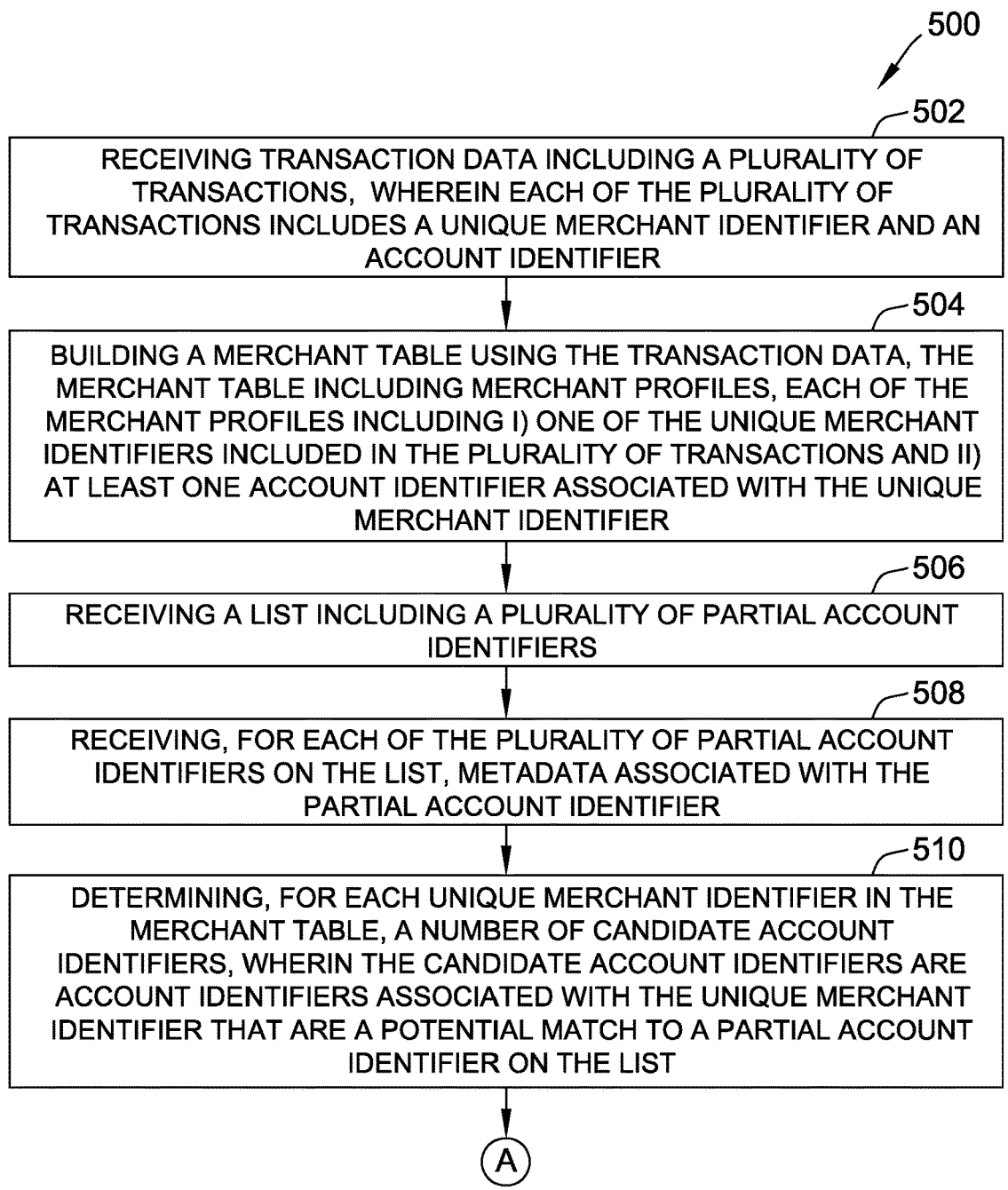
FIG. 5A is a flowchart illustrating an example process for identifying PANs from partial PANs.
Figure 5B:
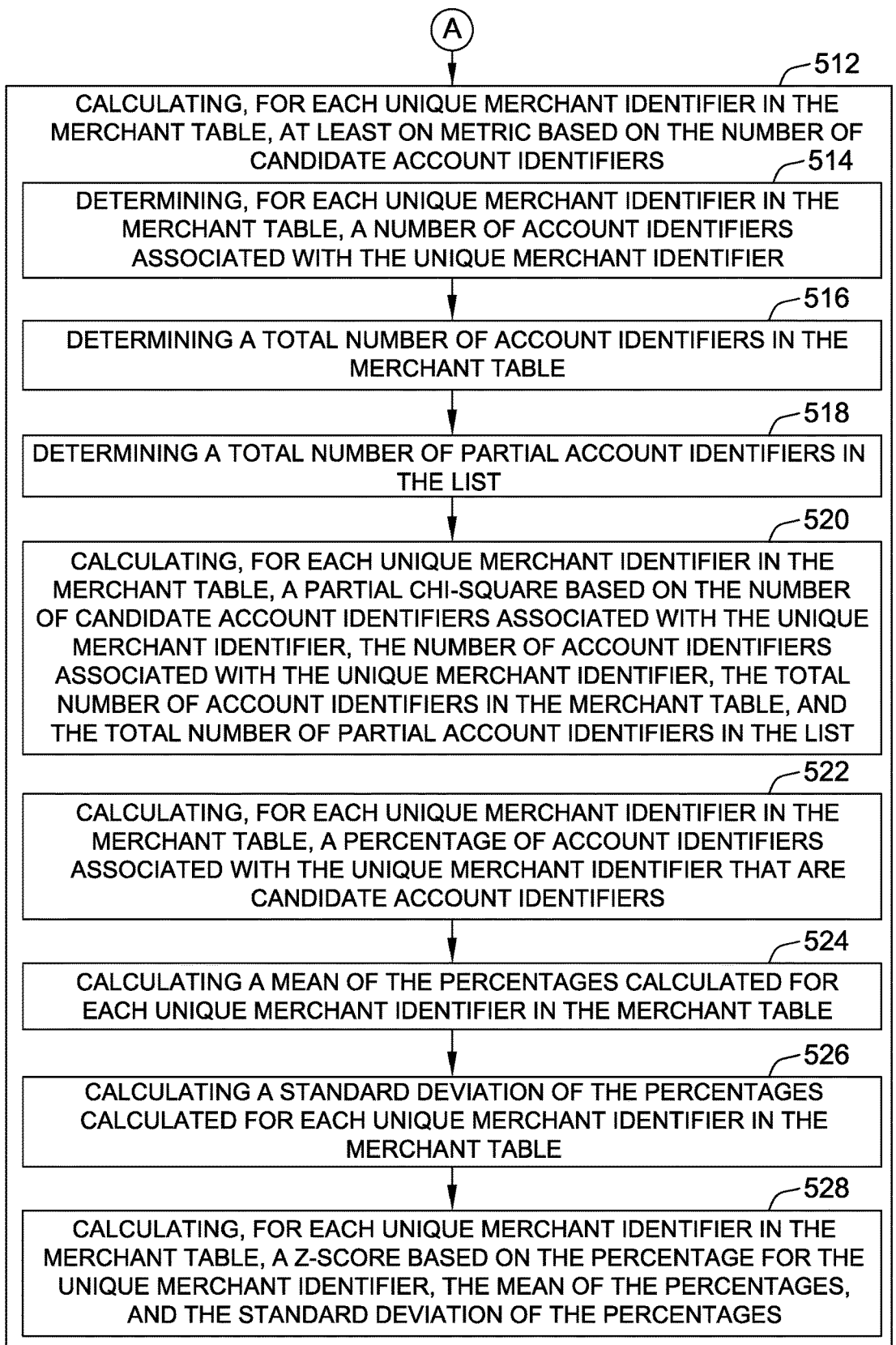
FIG. 5B is a continuation of the flowchart shown in FIG. 5A.
Figure 5C:
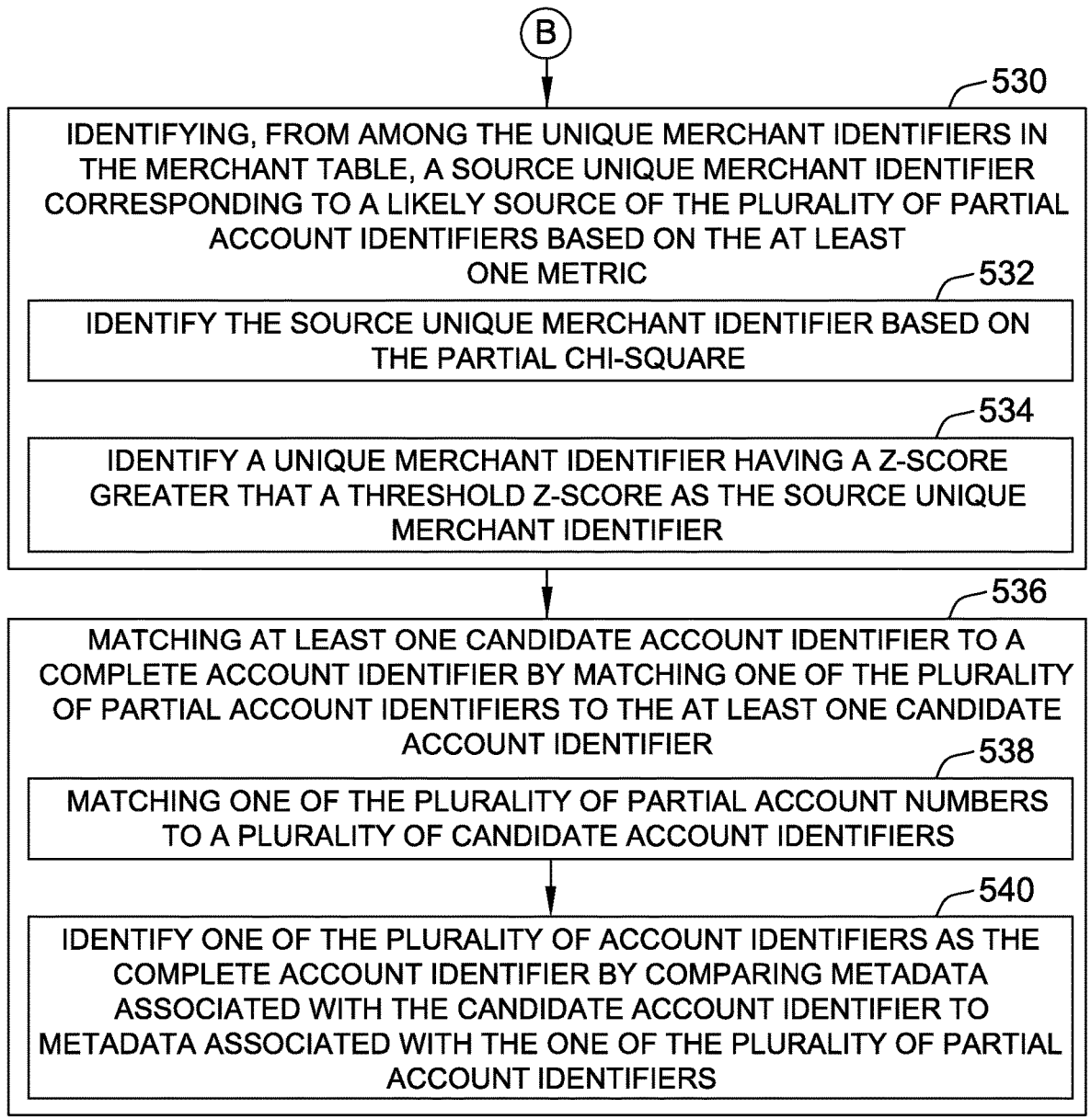
FIG. 5C is a continuation of the flowchart shown in FIG. 5B.
Figure 6:
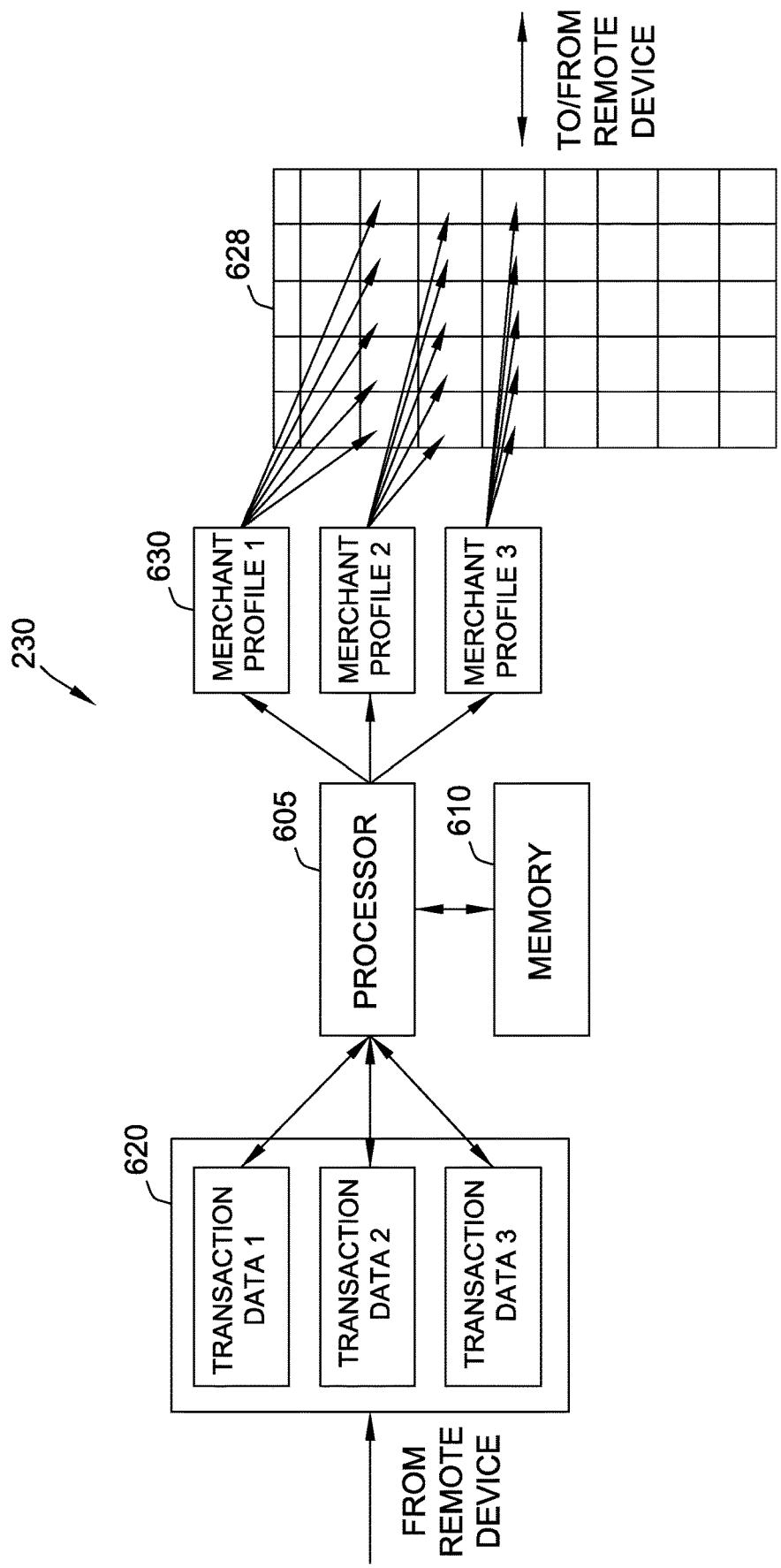
FIG. 6 illustrates an example configuration of a PAN identification computing device, in accordance with one embodiment of the present disclosure.

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with instructions such that it may execute the processes as illustrated in FIGS. 5 and 6, below.

In exemplary embodiments, processor 305 may include and/or be communicatively coupled to one or more modules for implementing the systems and methods described herein. For example, processor 305 may include a table builder module 330 configured to build a merchant table including a plurality of merchant profiles including one unique merchant identifier and at least one account identifier associated with the unique merchant identifier. Processor 305 may also include a determining module 332 configure to determine a number of candidate PANs. Processor 305 may also include a calculation module 334 configured to calculate at least one metric based on the determined number candidate PANs and identify a source unique merchant identifier from among the unique merchant identifiers in the merchant table corresponding to a likely source of the plurality of partial PANs based on the at least one metric. Processor 305 may also include a comparing module 336 configured to match candidate PANs to complete PANs by matching the partial PANs to the candidate PANs associated with the source of the partial PANs.

Figure 4:
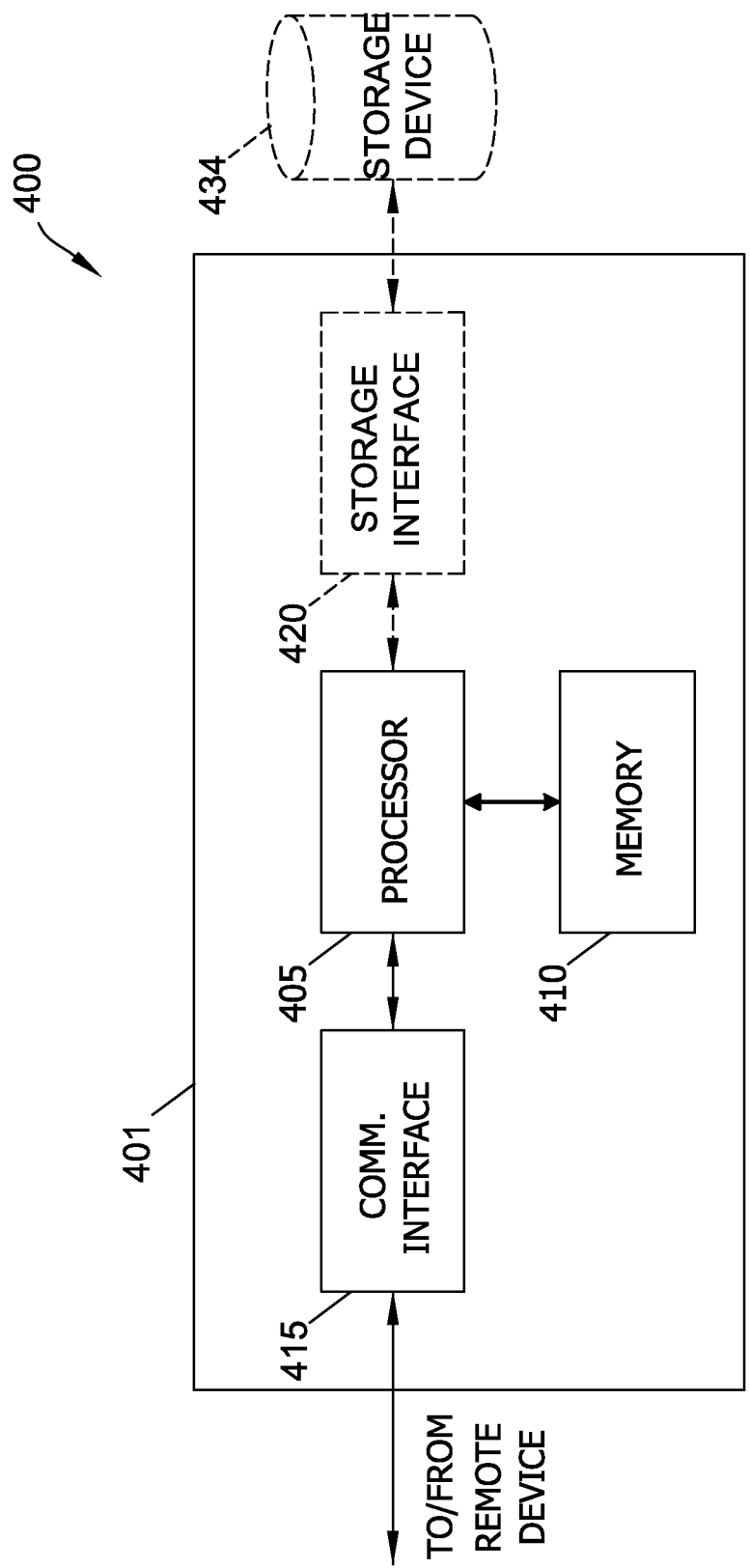
FIG. 4 illustrates an example configuration of the server system shown in FIG. 2, in accordance with an embodiment of the present disclosure.

FIG. 4 illustrates an example configuration of a server system 400, such as server system 212 (shown in FIG. 2). In the example embodiment, server system 400 includes at least one server computing device 401, in electronic communication with at least one storage device 434. Server computing device 401 may include, but is not limited to, database server 216 (shown in FIG. 2). In the exemplary embodiment, server computing device 401 includes a processor 405 for executing instructions (not shown) stored in a memory area 410. In an embodiment, processor 405 may include one or more processing units (e.g., in a multi-core configuration) for executing instructions. The instructions may be executed within various different operating systems on the server system 400, such as UNIX®, LINUX® (LINUX is a registered trademark of Linus Torvalds), Microsoft Windows®, etc. More specifically, the instructions may cause various data manipulations on data stored in storage device 434 (e.g., create, read, update, and delete procedures. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

In the example embodiment, processor 405 is operatively coupled to a communication interface 415 such that server system 400 is capable of communicating with a remote device such as a user system or another server system 400. For example, communication interface 415 may receive requests from PAN identification system 300 (FIG. 3) via the Internet, within the scope of the embodiment illustrated in FIG. 4.

In the example embodiment, processor 405 is also operatively coupled to a storage device 434, which may be, for example, any computer-operated hardware unit suitable for storing and/or retrieving data. In some embodiments, storage device 434 is integrated in server system 400. For example, server system 400 may include one or more hard disk drives as storage device 434. In certain embodiments, storage device 434 is external to server system 400 and is similar to database 220 (shown in FIG. 2). For example, server system 400 may include one or more hard disk drives as storage device 434. In other embodiments, storage device 434 is external to server system 400 and may be accessed by a plurality of server systems 400. For example, storage device 434 may include multiple storage units such as hard disks or solid state disks in a redundant array of inexpensive disks (RAID) configuration. Storage device 434 may include a storage area network (SAN) and/or a network attached storage (NAS) system. In certain embodiments, transaction data such as a unique merchant identifier, a time stamp, and/or an account identifier (e.g., a PAN) is stored in storage device 434. Such transaction data may be accessed by a remote device such as PAN identification computing device 230 (shown in FIG. 2) in communication with server system 400.

In some embodiments, processor 405 is operatively coupled to storage device 434 via a storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

FIG. 5 is a flowchart illustrating an example method 500 for identifying PANs associated with partial PANs, which may be implemented utilizing PAN identification system 224 (shown in FIG. 2). Method 500 may be implemented by a computing device, for example, PAN identification computing device 230 (shown in FIG. 2), in cooperation with PAN identification system 224.

In the example embodiment, method 500 includes receiving 502 transaction data including a plurality of transactions, wherein each of the plurality of transactions includes a unique merchant identifier and an account identifier (e.g., a PAN).

Method 500 may further include building 504 a merchant table using the transaction data, the merchant table including merchant profiles, each of the merchant profiles including i) one of the unique merchant identifiers included in the plurality of transactions and ii) at least one account identifier associated with the unique merchant identifier.

Method 500 may further include receiving 506 a list including a plurality of partial account identifiers (e.g., partial PANs). In some embodiments, method 500 may further include receiving 506, for each of the plurality of partial account identifiers on the list, metadata associated with the partial account identifier.

Method 500 may further include determining 510, for each unique merchant identifier in the merchant table, a number of candidate account identifiers, wherein the candidate account identifiers are account identifiers associated with the unique merchant identifier that are a potential match to a partial account identifier on the list.

Method 500 may further include calculating 512, for each unique merchant identifier in the merchant table, at least one metric based on the number of candidate account identifiers. In some embodiments, method 500 may further include determining 514, for each unique merchant identifier in the merchant table, a number of account identifiers associated with the unique merchant identifier, determining 516 a total number of account identifiers in the merchant, determining 518 a total number of partial account identifiers in the list, and calculating 520, for each unique merchant identifier in the merchant table, a partial chi-square based on the number of candidate account identifiers associated with the unique merchant identifier, the number of account identifiers associated with the unique merchant identifier, the total number of account identifiers in the merchant table, and the total number of partial account identifiers in the list. In certain embodiments, method 500 may further include calculating 522, for each unique merchant identifier in the merchant table, a percentage of account identifiers associated with the unique merchant identifier that are candidate account identifiers, calculating 524 a mean of the percentages calculated for each unique merchant identifier in the merchant table, calculating 526 a standard deviation a mean of the percentages calculated for each unique merchant identifier in the merchant table, and calculating 528, for each unique merchant identifier in the merchant table, a z-score based on the percentage for the unique merchant identifier, the mean of the percentages, and the standard deviation of the percentages.

Method 500 may further include identifying 530, from among the unique merchant identifiers in the merchant table, a source unique merchant identifier corresponding to a likely source of the plurality of partial account identifiers based on the at least one metric. In some embodiments, method 500 may further include identifying 532 the source unique merchant identifier based on the calculated partial chi-square. In certain embodiments, method 500 may further include identifying 534 a source unique merchant identifier having a z-score greater than a threshold z-score as the source unique merchant identifier.

Method 500 may further include matching 536 at least one candidate account identifier to a complete account identifier by matching one of the plurality of partial account identifiers to the at least one candidate account identifier. In some embodiments, method 500 may further include matching 538 one of the plurality of partial account identifiers to a plurality of candidate account identifiers and identifying 540 one of the plurality of candidate account identifiers as the complete account identifier by comparing metadata associated with the candidate account identifier to the metadata associated with the one of the plurality of partial account identifiers.

FIG. 6 illustrates an example configuration of a PAN identification computing device 230 (also shown in FIG. 2) for identifying PANs associated with partial PANs. PAN identification computing device 230 may include, but is not limited to, processor 605 for executing instructions. In some embodiments, processor 605 is similar to processor 405 (shown in FIG. 4). In the example embodiment, PAN identification computing device 230 includes executable instructions that are stored in a memory area 610. Processor 605 may include one or more processing units, for example, a multi-core configuration. Memory area 610 is any device allowing information such as executable instructions and/or written works to be stored and retrieved. Memory area 610 may include one or more computer readable media.

PAN identification computing device 230 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on PAN identification computing device 230, such as UNIX®, LINUX® (LINUX is a registered trademark of Linus Torvalds), Microsoft Windows®, etc. More specifically, the instructions may cause various data manipulations on a merchant table 628 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface (not shown) such that PAN identification computing device 230 is capable of communicating with a remote device, such as payment processor 210 (shown in FIG. 2). For example, communication interface may receive communications from client systems 214 and/or third parties (not shown) via the Internet, as illustrated in FIG. 2.

Processor 605 may also be operatively coupled to a storage device 620. Storage device 620 is any computer-operated hardware suitable for storing and/or retrieving data. In some embodiments, storage device 620 is integrated in PAN identification computing device 230. In other embodiments, storage device 620 is external to PAN identification computing device 230 and is similar to storage device 434 (shown in FIG. 4). For example, PAN identification computing device 230 may include one or more hard disk drives as storage device 434. In other embodiments, storage device 620 is external to PAN identification computing device 230 and may be accessed by a plurality of PAN identification computing device 230. For example, storage device 620 may include multiple storage units such as hard disks or solid state disks in a redundant array of inexpensive disks (RAID) configuration. Storage device 620 may include a storage area network (SAN) and/or a network attached storage (NAS) system.

In example embodiments, processor 605 is operatively coupled to storage device 620 via a storage interface 622. Storage interface 622 is any component capable of providing processor 605 with access to storage device 620. Storage interface 622 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 620.

In example embodiments, processor 605 is configured to instruct PAN identification computing device 230 to build a merchant table 628 using received transaction data. Merchant table 628 may include a plurality of merchant profiles 630 that may each include i) one unique merchant identifier and ii) at least one PAN associated with the unique merchant identifier.

In example embodiments, processor 605 is configured to instruct PAN identification computing device 230 to determine, for each unique merchant identifier in merchant table 628, a number of candidate PANs, where the candidate PANs are PANs associated with the unique merchant identifier that are a potential match to a partial PAN in a received list of partial PANs.

In example embodiments, processor 605 is configured to instruct PAN identification computing device 230 to calculate, for each unique merchant identifier in merchant table 628, at least one metric based on the number of candidate PANs for the unique merchant identifier. To calculate the at least one metric, processor 605 may instruct PAN identification computing device 230 to determine, for each unique merchant identifier in merchant table 628, a number of PANs associated with the unique merchant identifier (e.g., used in transactions with a merchant corresponding to the unique merchant identifier). Processor 605 may further instruct PAN identification computing device 230 to determine a total number of PANS in merchant table 628 and determine a total number of partial PANs in the received list. Processor 605 may further instruct PAN identification computing device 230 to calculate, for each unique merchant identifier in merchant table 628, a partial chi-square based on the number of candidate PANs associated with the unique merchant identifier, the number of PANs associated with the unique merchant identifier, the total number of PANs in merchant table 628, and the total number of partial PANs in the list. Additionally, to calculate the at least one metric, processor 605 may be configured to instruct PAN identification computing device 230 to calculate, for each unique merchant identifier in merchant table 628, a percentage of PANs associated with the unique merchant identifier that are candidate PANs, calculate a mean of the percentages calculated for each unique merchant identifier in merchant table 628, calculate a standard deviation of the percentages calculated for each unique merchant identifier in merchant table 628, and calculate, for each unique merchant identifier in merchant table 628, a z-score based on the percentage for the unique merchant identifier, the mean of the percentages, and the standard deviation of the percentages.

In example embodiments, processor 605 is configured to instruct PAN identification computing device 230 to identify, from among the unique merchant identifiers in merchant table 628, a source unique merchant identifier corresponding to a likely source of the plurality of partial PANS in the received list. Processor 605 may instruct PAN identification computing device 230 to identify the source unique merchant identifier based on the calculated partial chi-square. Additionally, processor 605 may instruct PAN identification computing device 230 to identify a unique merchant identifier having a z-score greater than a threshold z-score as the source unique merchant identifier.

In example embodiments, processor 605 is configured to instruct PAN identification computing device 230 to match at least one candidate PAN to a complete PAN by matching one of the plurality of partial PANS to the candidate PAN, where the candidate PAN is associated with the source unique merchant identifier (e.g., used in a transaction at a merchant corresponding to the source unique merchant identifier). Processor 605 may also instruct PAN identification computing device 230 to match one of the plurality of partial account identifiers to a plurality of candidate account identifiers (e.g., when the partial PAN cannot be unambiguously matched to a candidate PAN) and identify one of the plurality of candidate PANs as the complete PAN by comparing metadata associated with the candidate PAN to metadata associated with the one of the plurality PANs (e.g., by comparing expiration dates).

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
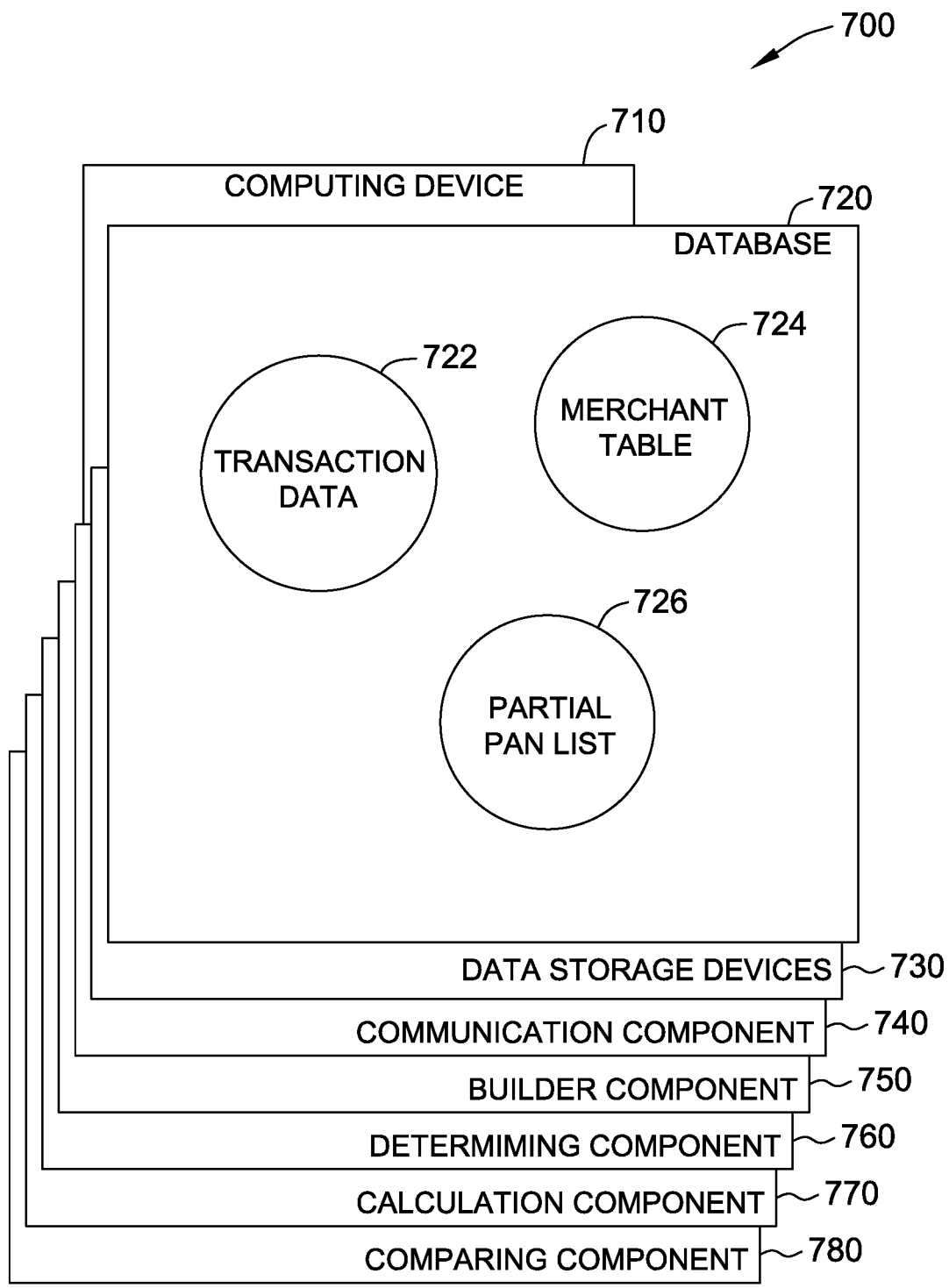
FIG. 7 shows a diagram of components of an example computing device that may be used in the system shown in FIG. 2.

FIG. 7 is a diagram 700 of components of one or more example computing devices that may be used in PAN identification system 224 shown in FIG. 2. In some embodiments, computing device 710 is similar to PAN identification computing device 230 (shown in FIG. 2). Database 720 may be coupled with several separate components within computing device 710, which perform specific tasks. In this embodiment, database 720 includes transaction data 722, merchant table 724, and partial PAN list 726. In some embodiments, database 720 is similar to database 220 (shown in FIG. 2).

Computing device 710 includes a communication component 740 for receiving transaction data 722 including a plurality of transactions and receiving a partial PAN list 726 including a plurality of partial PANs. Computing device 710 also includes a builder component 750 for building merchant table 724 including merchant profiles using transaction data 722. Computing device 710 also includes a determining component 760 for determining, for each unique merchant identifier in merchant table 724, a number of candidate PANs that are a potential match of a partial PAN in partial PAN list 726. Computing device 710 also includes a calculation component 770 for calculating, for each unique merchant identifier in merchant table 724, at least one metric based on the number of candidate PANs and identifying, from among the unique merchant identifiers in merchant table 724, a source unique merchant identifier corresponding to a likely source of the plurality of partial PANs based on the at least one metric. Computing device 710 also includes a comparing component 780 for matching candidate PANs to complete PANs by matching one of the partial PANs to the candidate PANs associated with the source unique merchant identifier.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of analysis of payment card transactions. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the primary account number (PAN) identification computing device are described herein as including general processing and memory devices, it should be understood that the PAN identification computing device is a specialized computer configured to perform the steps described herein for identifying PANs associated with partial PANs.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

According to the advantageous systems and methods described herein, a payment card network may advantageously monitor public spaces to identify exposed PANs before the exposed PANs are subject to misuse. Additionally, by regular continual monitoring of exposed PANs, the systems and methods described herein may identify at-risk PANs that are not otherwise known to be at risk, or associated with a known merchant source. The identification of at-risk PANs may be further categorized according to a calculated chi-square indicating the level of risk to which an existing PAN may be exposed (e.g., "low," "medium," "high," "very high," etc.). Using these confidence scores, the payment card issuer bank may advantageously prioritize the order in which at-risk PANs are replaced and/or investigated. Investigations into individual misuse events can be very time-consuming and costly, and the present systems and methods allow a payment card issuer to proactively score potential risk to their cardholder accounts and replace the associated PANs before misuse occurs.

What is claimed is:

1. A system for identifying complete account identifiers from partial account identifiers, the system comprising an account identification computing device comprising at least one processor and a memory device in communication with the at least one processor, the at least one processor configured to:
receive messages including transaction data for a plurality of transactions, each transaction message including a merchant identifier and an account identifier;
build a merchant table using the transaction data, the merchant table stored within a database and including a plurality of merchant profiles, each of the merchant profiles including i) one of the merchant identifiers included in the plurality of transactions, ii) an account identifier associated with the merchant identifier for the corresponding transaction, and iii) a merchant name;
parse the plurality of merchant profiles included in the merchant table to generate a plurality of data files, each of the plurality of data files including a consolidated merchant name and a list of account identifiers associated with the consolidated merchant name, each list of account identifiers representing accounts used to initiate transactions at merchants associated with the merchant identifiers that are associated with the same merchant name in association with a consolidated merchant name;
build, using the generated plurality of data files, an updated merchant table that includes a plurality of updated merchant profiles, each updated merchant profile including a consolidated merchant name and the account identifiers associated with the consolidated merchant name, wherein each consolidated merchant name includes one or more merchant identifiers associated with the same merchant name, wherein a number of updated merchant profiles in the updated merchant table is less than a number of merchant profiles in the merchant table;
receive a list including a plurality of partial account identifiers that correspond to potentially exposed account identifiers;
perform a compare operation within the database to determine a number of candidate account identifiers associated with each consolidated merchant name in the updated merchant table, wherein the candidate account identifiers are complete account identifiers associated with one of the consolidated merchant names that are at least a partial match to a partial account identifier on the list;
calculate, for each consolidated merchant name in the updated merchant table, at least one metric based on the number of candidate account identifiers associated with the respective consolidated merchant name;
identify, from among the consolidated merchant names in the updated merchant table, at least one source merchant name corresponding to a likely common source of the plurality of partial account identifiers based on the at least one metric;
match at least one candidate account identifier to a complete account identifier associated with the consolidated merchant name by matching one of the plurality of partial account identifiers linked to the at least one source merchant name to the at least one candidate account identifier to output a matched account identifier, thereby identifying the matched account identifier as one of the potentially exposed account identifiers corresponding to the received list;
store a list of the matched account identifiers in the database; and
transmit a message advising that the matched account identifiers were exposed to a data breach.

2. The system of claim 1, wherein to calculate the at least one metric, the processor is further configured to:
determine, for each consolidated merchant name in the updated merchant table, a number of account identifiers associated with the consolidated merchant name;
determine a total number of account identifiers in the updated merchant table;
determine a total number of partial account identifiers in the list; and
calculate, for each consolidated merchant name in the updated merchant table, a partial chi-square based on the number of candidate account identifiers associated with the consolidated merchant name, the number of account identifiers associated with the consolidated merchant name, the total number of account identifiers in the updated merchant table, and the total number of partial account identifiers in the list.

3. The system of claim 2, wherein to identify at least one source merchant name, the processor is configured to identify the at least one source merchant name based on the calculated partial chi-squares.

4. The system of claim 2, wherein to calculate the at least one metric, the processor is further configured to:
calculate, for each consolidated merchant name in the updated merchant table, a percentage of account identifiers associated with the consolidated cleansed merchant name that are candidate account identifiers;
calculate a mean of the percentages calculated for each consolidated merchant name in the updated merchant table;
calculate a standard deviation of the percentages calculated for each consolidated merchant name in the updated merchant table; and
calculate, for each consolidated merchant name in the updated merchant table, a z-score based on the percentage for the consolidated merchant name, the mean of the percentages, and the standard deviation of the percentages.

5. The system of claim 4, wherein to identify a source merchant name, the processor is further configured to identify a consolidated merchant name having a z-score greater than a threshold z-score as the source merchant name.

6. A computer-implemented method for identifying complete account identifiers from partial account identifiers, said computer-implemented method implemented using an account identification computing device in communication with a memory device, said computer-implemented method comprising:

receiving transaction messages including transaction data for a plurality of transactions including a merchant identifier and an account identifier;

building a merchant table using the transaction data, the merchant table stored within a database and including a plurality of merchant profiles, each of the merchant profiles including i) one of the merchant identifiers included in the plurality of transactions, ii) an account identifier associated with the merchant identifier for the corresponding transaction, and iii) a merchant name;

parsing the plurality of merchant profiles included in the merchant table to generate a plurality of data files, each of the plurality of data files including a consolidated merchant name and a list of account identifiers associated with the consolidated merchant name, each list of account identifiers representing accounts used to initiate transactions at merchants associated with the merchant identifiers that are associated with the same merchant name in association with a consolidated merchant name;

building, using the generated plurality of data files, an updated merchant table that includes a plurality of updated merchant profiles, each updated merchant profile including a consolidated merchant name and the account identifiers associated with that consolidated merchant name, wherein each consolidated merchant name includes one or more merchant identifiers associated with the same merchant name, wherein a number of updated merchant profiles in the updated merchant table is less than a number of merchant profiles in the merchant table;

receiving, by the account identification computing device, a list including a plurality of partial account identifiers that correspond to potentially exposed account identifiers;

performing, by the account identification computing device, a compare operation with the database to determine a number of candidate account identifiers associated with each consolidated merchant name in the updated merchant table, wherein the candidate account identifiers are complete account identifiers associated with one of the consolidated merchant names that are at least a partial match to a partial account identifier on the list;

calculating for each consolidated merchant name in the updated merchant table, at least one metric based on the number of candidate account identifiers associated with the respective consolidated merchant name;

identifying from among the consolidated merchant names in the updated merchant table, a source merchant name corresponding to a likely common source of the plurality of partial account identifiers based on the at least one metric;

matching at least one candidate account identifier to a complete account identifier associated with the source merchant name by matching one of the plurality of partial account identifiers linked to the consolidated merchant name to the at least one candidate account identifier to output a matched account identifier, thereby identifying the matched account identifier as one of the potentially exposed account identifiers corresponding to the received list;

storing a list of the matched account identifiers in the database; and transmitting a message advising that the at least one matched account identifier from the list of the matched account identifiers was exposed to a data breach.

7. The system of claim 1, wherein the processor is further configured to receive, for each of the plurality of partial account identifiers on the list, metadata associated with the partial account identifier.

8. The system of claim 7, wherein the metadata includes at least one of a channel, an expiration date, and a date the partial account identifier was added to the list.

9. The system of claim 7, wherein the transaction data includes transaction metadata, and wherein to match at least one candidate account identifier to a complete account identifier, the processor is configured to:

match one of the plurality of partial account identifiers to a plurality of candidate account identifiers; and identify one of the plurality of candidate account identifiers as the complete account identifier by comparing the transaction metadata associated with the candidate account identifier to the metadata associated with the one of the plurality of partial account identifiers.

10. The system of claim 1, wherein the at least one processor is further configured to, for each matched account identifier stored in the list in the database, store a status indicating a level of risk.

11. The computer-implemented method of claim 6, wherein the transaction data includes transaction metadata, and wherein matching at least one candidate account identifier to a complete account identifier further comprises:

matching, by the account identification computing device, one of the plurality of partial account identifiers to a plurality of candidate account identifiers; and identifying, by the account identification computing device, one of the plurality of candidate account identifiers as the complete account identifier by comparing the transaction metadata associated with the candidate account identifier to the metadata associated with the one of the plurality of partial account identifiers.

12. The computer-implemented method of claim 6, wherein calculating the at least one metric comprises:

determining for each consolidated merchant name in the updated merchant table, a number of account identifiers associated with the consolidated merchant name;

determining a total number of account identifiers in the updated merchant table;

determining a total number of partial account identifiers in the list; and calculating for each of the consolidated merchant names in the updated merchant table, a partial chi-square based on the number of candidate account identifiers associated with the consolidated merchant name, the number of account identifiers associated with the consolidated merchant name, the total number of account identifiers in the updated merchant table, and the total number of partial account identifiers in the list.

13. The computer-implemented method of claim 12, wherein identifying a consolidated merchant name comprises identifying, by the account identification computing device, the source merchant name based on the calculated partial chi-squares.

14. The computer-implemented method of claim 12, wherein calculating the at least one metric further comprises:

calculating for each consolidated merchant name in the updated merchant table, a percentage of account identifiers associated with the consolidated merchant name that are candidate account identifiers;

calculating a mean of the percentages calculated for each consolidated merchant name in the updated merchant table;

calculating a standard deviation of the percentages calculated for consolidated merchant name in the updated merchant table; and calculating for each consolidated merchant name in the updated merchant table, a z-score based on the percentage for the consolidated merchant name, the mean of the percentages, and the standard deviation of the percentages.

15. The computer-implemented method of claim 14, wherein identifying a source merchant name comprises identifying, by the account identification computing device, a consolidated merchant name having a z-score greater than a threshold z-score as the source merchant name.

16. A non-transitory computer-readable storage media having computer-executable instructions embodied thereon, wherein when executed by an account identification computing device having at least one processor coupled to at least one memory device, the computer-executable instructions cause the processor to:

receive transaction messages including transaction data for a plurality of transactions including a merchant identifier and an account identifier;

build a merchant table using the transaction data, the merchant table stored within a database and including a plurality of merchant profiles, each of the merchant profiles including i) one of the merchant identifiers included in the plurality of transactions, ii) an account identifier associated with the merchant identifier of the corresponding transaction, and iii) a merchant name;

parse the plurality of merchant profiles included in the merchant table to generate a plurality of data files, each of the plurality of data files including a consolidated merchant name and a list of account identifiers associated with the consolidated merchant name, each list of account identifiers representing accounts used to initiate transactions at merchants associated with the merchant identifiers that are associated with the same merchant name in association with a consolidated merchant name;

build, using the generated plurality of data files, an updated merchant table that includes a plurality of updated merchant profiles, each updated merchant profile including a consolidated merchant name and the account identifiers associated with that consolidated merchant name, wherein each consolidated merchant name includes one or more merchant identifiers with the same merchant name, wherein a number of updated merchant profiles in the updated merchant table is less than a number of merchant profiles in the merchant table;

receive a list including a plurality of partial account identifiers that correspond to potentially exposed account identifiers;

perform a compare operation to determine a number of candidate account identifiers associated with each consolidated merchant name in the updated merchant table, wherein the candidate account identifiers are complete account identifiers associated with one of the consolidated merchant names that are at least a partial match to a partial account identifier on the list;

calculate, for each consolidated merchant name in the updated merchant table, at least one metric based on the number of candidate account identifiers associated with the respective consolidated merchant name;

identify, from among the consolidated merchant names in the updated merchant table, at least one source merchant name corresponding to a likely common source of the plurality of partial account identifiers based on the at least one metric;

match at least one candidate account identifier to a complete account identifier associated with the source merchant name by matching one of the plurality of partial account identifiers linked to the source merchant name to the at least one candidate account identifier to output a matched account identifier, thereby identifying the matched account identifier as one of the potentially exposed account identifiers corresponding to the received list;

store a list of the matched account identifiers in the database; and transmit a message advising that the matched account identifiers were exposed to a data breach.

17. The non-transitory computer-readable storage media of claim 16, wherein to calculate the at least one metric, the computer-executable instructions cause the processor to:

determine, for each consolidated merchant name in the updated merchant table, a number of account identifiers associated with the consolidated merchant name;

determine a total number of account identifiers in the updated merchant table;

determine a total number of partial account identifiers in the list; and calculate, for each consolidated merchant name in the updated merchant table, a partial chi-square based on the number of candidate account identifiers associated with the consolidated merchant name, the number of account identifiers associated with the consolidated merchant name, the total number of account identifiers in the updated merchant table, and the total number of partial account identifiers in the list.

18. The non-transitory computer-readable storage media of claim 17, wherein to identify a source merchant name, the computer-executable instructions cause the processor to identify the source merchant name based on the calculated partial chi-squares.

19. The non-transitory computer-readable storage media of claim 17, wherein to calculate the at least one metric, the computer-executable instructions further cause the processor to:

calculate, for each consolidated merchant name in the updated merchant table, a percentage of account identifiers associated with the consolidated merchant name that are candidate account identifiers;

calculate a mean of the percentages calculated for each consolidated merchant name in the updated merchant table;

calculate a standard deviation of the percentages calculated for each consolidated merchant name in the updated merchant table; and calculate, for each consolidated merchant name in the updated merchant table, a z-score based on the percentage for consolidated merchant name, the mean of the percentages, and the standard deviation of the percentages.

20. The non-transitory computer-readable storage media of claim 16, wherein to calculate the at least one metric, the computer-executable instructions further cause the processor to:

calculate an interaction percentage for each consolidated merchant name by dividing the candidate account identifiers for the corresponding consolidated merchant name by the total number of account identifiers associated with the corresponding merchant name.

\* \* \* \* \*